United States Patent [19]

Newbery et al.

[11] Patent Number: 5,086,869
[45] Date of Patent: Feb. 11, 1992

[54] ROTATABLE OPERATOR CONTROL STATION

[75] Inventors: Brian L. Newbery; Kel W. Loewen; Grant H. Adolph, all of Winnipeg, Canada

[73] Assignee: Ford New Holland, Inc., New Holland, Pa.

[21] Appl. No.: 567,439

[22] Filed: Aug. 14, 1990

[51] Int. Cl.⁵ ............................................. B60K 26/00
[52] U.S. Cl. .................................. 180/329; 180/89.13
[58] Field of Search ..................... 180/89.13, 329, 326, 180/330, 331

[56] References Cited

U.S. PATENT DOCUMENTS

| | | | |
|---|---|---|---|
| 3,841,429 | 10/1974 | Falcone et al. | 180/89.13 |
| 4,026,379 | 5/1977 | Dunn et al. | 180/331 |
| 4,372,341 | 2/1983 | Crawley | 180/329 |
| 4,392,546 | 7/1983 | Brown et al. | 180/89.13 |
| 4,822,962 | 4/1989 | MacCourt | 200/61.88 |

FOREIGN PATENT DOCUMENTS 2099767 12/1982 United Kingdom ............... 180/329

OTHER PUBLICATIONS

Ford New Holland Sales Brochure entitled "100 PTO hp BiDirectional TM Tractor, 9030 Series".

Primary Examiner—Kenneth R. Rice
Attorney, Agent, or Firm—Larry W. Miller; Frank A. Seemar

[57] ABSTRACT

An operator's control station for a hydrostatically driven tractor in which the operator's control station is rotatable to orient the operator selectively in opposing directions is disclosed wherein a control panel having control devices for manipulating operative functions of the tractor is connected to a pan member supporting the seat cushion receiving the operator such that the control panel rotates with the operator's control station. The pan member is positioned above both the fore-and-aft adjustment mechanism and the height adjustment mechanism for the seat so that the control panel is maintained in a constant positional relationship relative to the operator irrespective of the adjusted position of the seat relative to the steering mechanism.

1 Claim, 3 Drawing Sheets

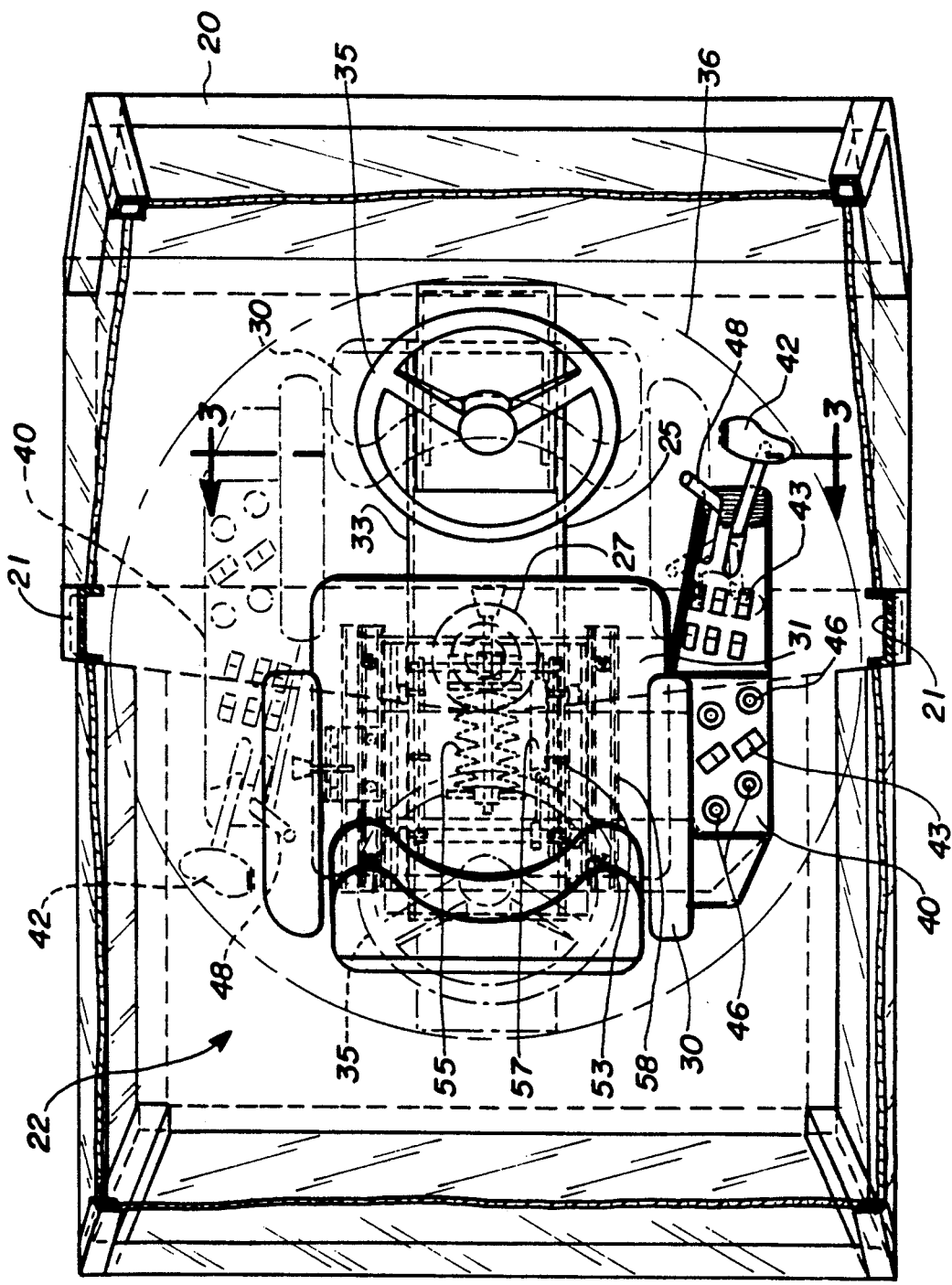

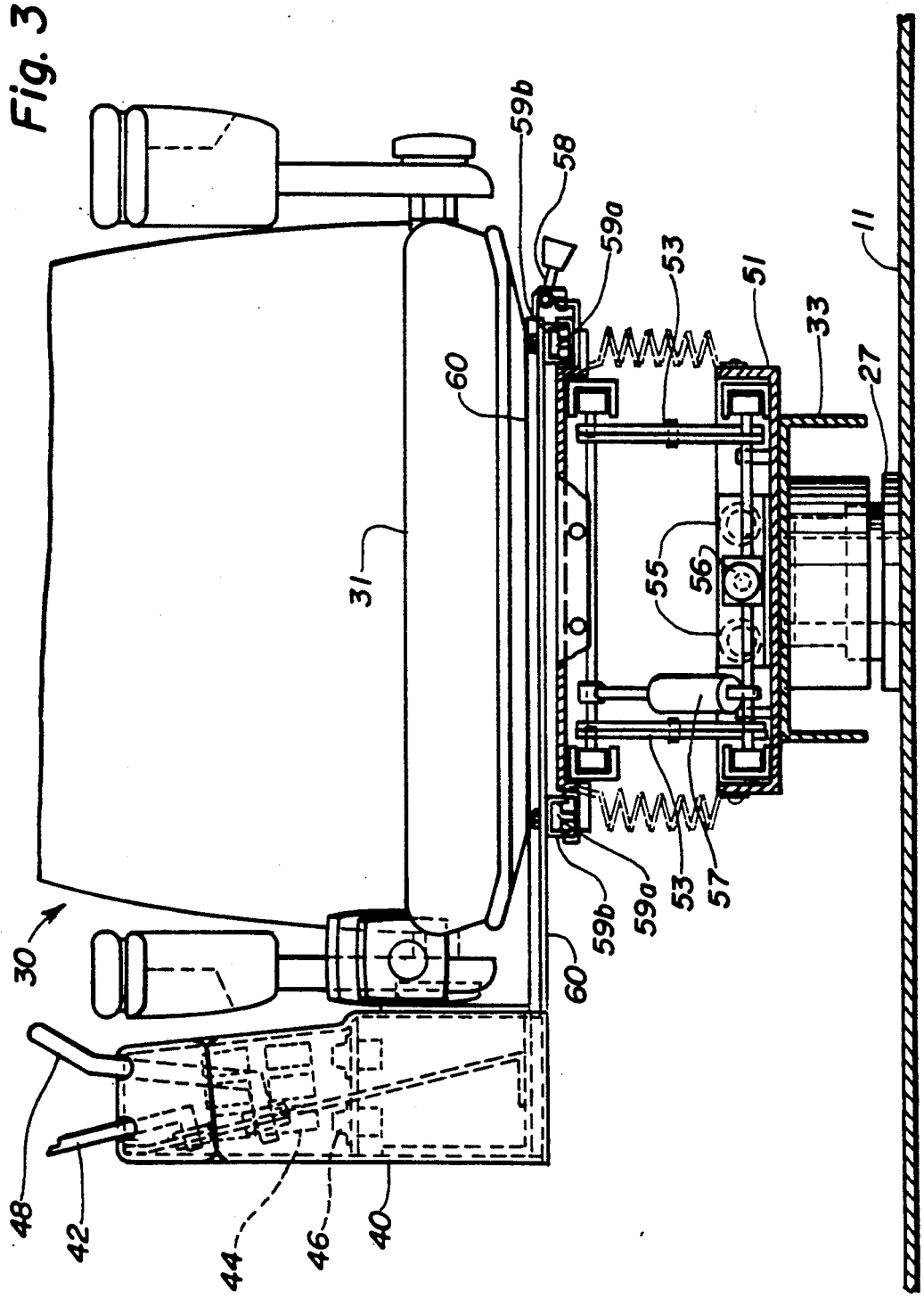

ROTATABLE OPERATOR CONTROL STATION

BACKGROUND OF THE INVENTION

This invention relates generally to tractors having an operator's station rotatable about an arc of at least approximately 180° to permit proper orientation of the operator for convenient operation of the tractor in opposing directions and, more particularly, to a control panel for controlling the operative functions of the tractor being mounted for movement with, and in fixed relationship to, the seat.

A hydrostatically driven tractor of the type shown in U.S. Pat. No. 4,372,341 and in U.S. Pat. No. 4,822,962, is operable in opposing directions with equal efficiency. To facilitate the operation of such a tractor, the operator's seat and steering mechanism are formed as a part of a console pivotally supported from the frame of the vehicle to permit rotation of the console about a generally vertical pivot axis to enable a positioning of the operator sitting in the seat cushion to face the forward direction of travel irrespective of which opposing direction is considered to be forward.

The operator's station is mounted within a cab enclosure and is provided with a control panel having mounted thereon various control devices for operatively controlling the various functions of the tractor, such as hydraulic lift functions, power-takeoff engagement, and speed and direction of movement of the tractor. These particular control devices have been customarily mounted laterally of the pivotable console such that the operator uses one hand when operating the controls in a first direction, but then must utilize the other hand to manipulate the control devices when the console is rotated to face in the opposing direction.

It would be desirable to provide an operator's station for a hydrostatically driven tractor in which the operator's station includes a rotatable console in which the control panel mounting the various control devices for manipulating the operative functions of the tractor is rotatable with the console so that the operator will have consistent, uniformly positioned mechanism for operation of the tractor.

SUMMARY OF THE INVENTION

It is an object of this invention to overcome the aforementioned disadvantages of the prior art by providing a rotatable operator's station having the control panel affixed to the rotatable console for movement with the operator's seat It is another object of this invention to mount the control panel in a position to be movable with the seat so that the positional relationship between the control panel and the operator's seat will be maintained.

It is a feature of this invention that the control panel is formed as part of a pan member positioned underneath the seat cushion, but above the adjustment devices in the seat for positionally varying the location of the operator's seat relative to the steering mechanism.

It is an advantage of this invention that the control panel is positioned in a fixed relationship with respect to the operator's seat irrespective of the positional adjustments made to the seat or the rotated position of the seat relative to the tractor.

It is another advantage of this invention that the operator will have a uniform positioning of the control panel irrespective of the adjustments made to the seat.

It is another feature of this invention that the control panel is moveable with the seat relative to the steering mechanism with respect to all positional adjustments of the seat.

It is still another object of this invention to provide an operator's station having a control panel moveable in a fixed relationship with the operator's seat, which is durable in construction, inexpensive of manufacture, carefree of maintenance, facile in assemblage, and simple and effective in use.

These and other objects, features and advantages are accomplished according to the instant invention by providing an operator's control station for a hydrostatically driven tractor in which the operator's control station is rotatable to orient the operator selectively in opposing directions, wherein a control panel having control devices for manipulating operative functions of the tractor is connected to a pan member supporting the seat cushion receiving the operator such that the control panel rotates with the operator's control station. The pan member is positioned above both the fore-and-aft adjustment mechanism and the height adjustment mechanism for the seat so that the control panel is maintained in a constant positional relationship relative to the operator irrespective of the adjusted position of the seat relative to the steering mechanism.

BRIEF DESCRIPTION OF THE DRAWINGS

The advantages of this invention will become apparent upon consideration of the following detailed disclosure of the invention, especially when taken into conjunction with the accompanying drawings wherein:

FIG. 2 is a partial cross-sectional view of the vehicle showing a top plan view of the operator's station corresponding to lines 2—2 of FIG. 1, the rotated position of the console being shown in phantom; and FIG. 3 is a partial cross-sectional view of the operator's station corresponding to lines 3—3 of FIG. 2 to show an elevational view of the operator's seat and attached control panel.

DETAILED DESCRIPTION OF THE PREFERRED EMBODIMENT

Figure 1:
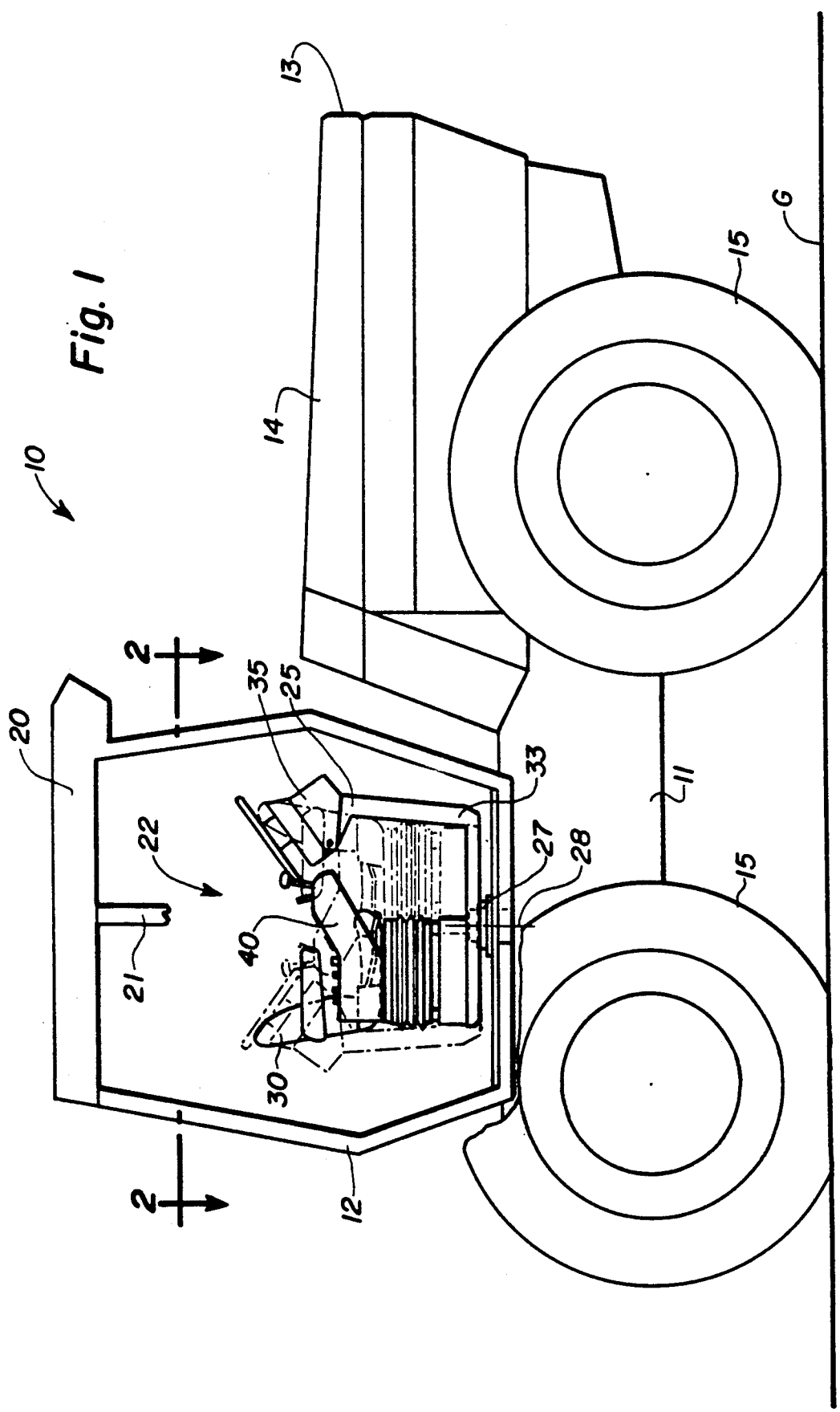
FIG. 1 is a side elevational view of a tractor incorporating the principles of the instant invention, a portion of operator's cab being broken away to more clearly show the operator's station, the rotative movement of the console being shown in phantom.

Referring now to FIG. 1, a side elevational view of a tractor 10 incorporating the principles of the instant invention can best be seen. As described in U.S. Pat. No. 4,372,341 and in U.S. Pat. No. 4,822,962, the descriptive portions of both patents being incorporated herein by reference, the tractor 10 is hydrostatically driven and can be operated with equal efficiency in either opposing direction. The tractor 10 is typically referred to as having a cab end 12 and an engine end 13 to which reference is typically made to indicate the forward direction of travel. The tractor 10 is provided with a frame 11 supported above the ground G by conventional ground wheels 15. Operative power is provided by an engine (not shown) enclosed within the hood 14 positioned at the engine end 13 of the tractor 10. The tractor 10 is preferably articulated so that the steering can be accomplished through conventional manipulation of the articulation joint (not shown). Alternatively, the tractor 10 could be steered through a conventional pivotable turning movement of one pair of the ground wheels 15.

Referring now to FIGS. 1-3, it can be seen that the operator's cab 20 is mounted on the cab end 12 of the tractor 10 and forms an enclosure within which the operator's station 22 is positioned. The operator's station 22 includes a pivotable console 25 mounted on a pivot mechanism 27 supported by the frame 11. The pivot mechanism 27 defines a pivot axis 28 about which the console 25 is rotatably movable to orient the operator so that the operator is facing the selected forward direction of travel, which can be toward either the cab end 12 or the engine end 13, depending on the direction of oil flow through the hydraulic system of the hydrostatically driven tractor 10.

The console 25 includes a seat 30, a steering mechanism 35, a hollow housing 33 extending between the seat 30 and the steering mechanism 35 to position the steering mechanism 35 at an appropriate location for convenient manipulation by the operator positioned in the seat 30, and a control panel 40 having mounted thereon various control devices, such as a control lever 42 operable to control the speed and direction of travel of the tractor 10; rocker switches 44 operable to control electrohydraulic functions, e.g. three point hitch lift cylinders, auxiliary attachments, etc.; 46 for controlling the rate of hydraulic flow to electro-hydraulic functions; and a PTO engagement lever 48.

The cab 20 provides a relatively small space within which the console 25 can be pivotally moved about the pivot axis 28. Accordingly, it is necessary to reduce the overall length of the console 25 by tilting the steering mechanism 35 toward the seat 30 and to move the seat 30 toward the steering mechanism 35 to permit the console 25 to clear the cab support posts 21 during its rotative movements. The arc 36 shown in FIG. 2 depicts the path of movement of the console 25 when being rotated from one selected orientation to the other. Because of the rotative movements imposed on the steering mechanism 35, it is preferable that the steering operation be accomplished with a conventional hydraulically operated mechanism, rather than mechanically.

The seat 30 is provided with a base frame member 51 which is attached to the housing 33 and supports the seat 30 for rotation on the pivot mechanism 27 about the axis 28. The base frame member 51 supports a conventional height adjustment mechanism 53 operable to selectively permit the seat 30 to move vertically relative to the base member 51, thereby changing the height of the seat 30 relative to the steering mechanism 35. The seat 30 is also provided with a conventional suspension mechanism 55 including an adjustment mechanism 56 to compensate for the weight of the operator positioned in the seat 30, and a shock absorber 57 to provide smooth riding characteristics.

The seat 30 is also provided with a fore-and-aft adjustment mechanism 58 which includes a pair of transversely spaced bottom rails 59a fixed connected to the height adjustment mechanism 53 for vertical movement therewith and adapted to slidably receive a corresponding pair of top rails 59b to permit linear movement of the seat cushion 31 in a fore-and-aft direction relative to the steering mechanism 35, permitting the operator positioned on the seat cushion 31 to selectively adjust his position relative to the steering mechanism 35 for convenient and comfortable operation thereof.

The seat 30 further includes a pan member 60 affixed to the top rails 59b of the fore-and-aft adjustment mechanism 58 so as to be moveable therewith. The pan member 60 directly supports the cushion 31 and extends laterally of the cushion 31 for the mounting of the control panel 40 transversely of the cushion 31. Accordingly, the control panel 40 is positioned to the side of the operator seated on the cushion 31 and is movable with the cushion 31 so that the relative position between the control panel 40 and the seat cushion 31 is fixed.

One skilled in the art will readily realize that the control panel 40 is movable with the seat cushion 31 irrespective of the adjustments made with the height adjustment mechanism 53 or the fore-and-aft adjustment 58 relative to the steering mechanism 35. Furthermore, the control panel 40 is rotatably movable with the seat 30 about the pivot mechanism 27 defining the axis 28, allowing the operator positioned on the cushion 31 to utilize the same hand to control the operative functions of the tractor 10 irrespective of the rotated or adjusted positions of the seat 30.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a frame supported above the ground by ground engaging wheels to mobilely support said vehicle over the ground; and operator controls supported by said frame to control operative functions of sad vehicle, said operator controls including a pivotable console selectively rotatable about a pivot mechanism defining a generally vertically pivot axis about which said console is rotatable for selectively orienting an operator positioned on said console in one of at least two opposing directions, said console including a seat, a steering mechanism for controlling the directional movement of said vehicle over the ground, and a housing supporting said steering mechanism for rotative movement with said seat about said pivot axis, said operator controls further including a control panel having a plurality of control devices mounted thereon for controlling corresponding operational functions of said vehicle, the improvement comprising:

mounting said control panel on said console for pivotal movement thereof with said seat about said pivot axis;

said seat including fore-and-aft adjustment means for selectively positioning said seat relative to said steering mechanism in a direction toward and away from said steering mechanism; said seat further having a pan member supporting a seat cushion for receiving said operator and being moveable with said seat, said control panel being affixed to said pan member for movement with said seat, thereby maintaining the positional relationship between the control panel and the operator sitting on said seat cushion during movement of said seat toward and away from said steering mechanism, said seat further including height adjustment means for effecting a vertical adjustment movement of said seat cushion relative to said steering mechanism, said height adjustment means being positioned above said pivot mechanism to effect vertical movement of said pan member without causing vertical movement of said steering mechanism such that the positional relationship of said control panel relative to an operator sitting on said seat cushion is maintained during vertical adjustment movement of said seat relative to said steering mechanism.

* * * * *